Patented Jan. 26, 1954

2,667,489

UNITED STATES PATENT OFFICE 2,667,489

β-(TERTIARY ALKYLMERCAPTO) N-ETHYL QUATERNARY PYRIDINIUM AND QUINOLINIUM DERIVATIVES

John K. Fincke, San Jose, Calif., assignor to Monsanto Chemical Company, St. Louis, Mo., a corporation of Delaware No Drawing. Application January 2, 1952,
Serial No. 264,689

7 Claims. (Cl. 260—286)

This invention relates to new chemical compounds having unusual efficacy as germicides. More specifically the invention relates to a new class of quaternary ammonium compounds.

Quaternary ammonium compounds are well-known and widely used as germicidal and antiseptic agents. Most of these compounds are difficult to prepare and costly. Quaternary salts also vary substantially in their relative germicidal effects and the effectiveness of a new compound is difficult to predict. The primary purpose of this invention is to provide a new family of quaternary compounds having unusual effectiveness as germicidal agents and which are readily prepared from inexpensive and abundantly available raw materials.

The new class of chemical compounds can be prepared from polymers of propylene, isobutylene and mixtures comprised substantially of either or both of said olefins, wherein there are from 14 to 16 carbon atoms inclusive. When these polymers are reacted with hydrogen sulfide, the substitution takes place on the terminal olefinic double bond and the sulfur is necessarily attached to a tertiary carbon atom making the resulting alkyl radical a tertiary alkyl group. The mercaptan so prepared is reacted successively with ethylene oxide, hydrogen chloride and finally with a cyclic tertiary amine, such as pyridine, the picolines, especially 2-methylpyridine, the lutidines, the quinolines, the lower alkyl substituted quinolines, and the other lower alkyl substituted pyridines, wherein the alkyl radical has up to three carbon atoms. The new compounds may be represented by the general structural formula:

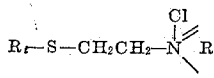

wherein $R_t$ is a tertiary alkyl radical characteristic of its origin through the polymerizations of propylene and/or isobutylene and subsequent reaction with hydrogen sulfide, and

is a hydrocarbon radical of the group consisting of

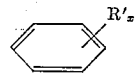

and

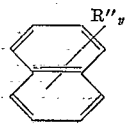

wherein $R'$ and $R''$ are selected from the group consisting of hydrogen atoms and alkyl radicals having up to three carbon atoms, and wherein $x$ and $y$ are integers from zero (0) to three (3) indicative of the number of $R'$ and $R''$ substituents.

In accordance with this method of preparation the tertiary mercaptans are converted to the corresponding mercaptoethanols by reaction with ethylene oxide in a closed agitated reactor by charging the mercaptan and a small proportion of solid alkali metal hydroxide, and heating the reaction mass while bubbling ethylene oxide into the vessel. The reaction is exothermic, and it is usually desirable to remove the external source of heat as soon as the reaction begins. The reaction is continued until one mole of ethylene oxide has been taken up, at which time the flow of ethylene oxide is interrupted. The reaction mass is then treated with carbon dioxide to neutralize the excess alkali and the resulting tertiary alkyl mercaptoethanol separated by filtration and purified by vacuum distillation if desired.

The tertiary mercaptoethanols, in accordance with the preferred method of preparation, are reacted with anhydrous hydrogen chloride. The reaction is preferably conducted in a closed glass vessel provided with a mechanical agitator, a thermometer and a reflux condenser. While continuously being agitated, anhydrous hydrogen chloride is bubbled through the vessel which is held in an ice or cold water bath. The reaction should be carefully controlled to avoid temperatures above 70° C. The reaction may be continued until complete as evidenced by the cessation of heat evolution. The excess hydrogen chloride and water may be removed by a water aspirator, or other suitable vacuum pump. The product may then be fractionated in a suitable efficient distillation column, and the tertiary mercaptoethanol chlorides so obtained.

The tertiary alkyl mercaptoethyl chlorides are then converted to the quaternary ammonium chlorides by reaction with tertiary amines. The reaction is effected by mixing the chlorides and the amines and refluxing them for sufficient periods to effect completion of the reaction. Generally it is desirable to use an excess of the tertiary amine which may readily be recovered for reuse. The tertiary ammonium chlorides which separate may be purified by washing with diethyl ether, dissolving in acetone, and after filtering, separating the acetone by means of a suitable vacuum. Diluents such as benzene or alcohols may be used as reaction media.

The new β-(tertiary alkylmercapto) ethyl quaternary ammonium derivatives are particularly useful as germicides and are outstanding in their power to destroy the bacterium *Eberthella typhi*. It has been found that the use of the tertiary alkyl derivatives is preferred to the straight chain alkyl derivatives, particularly with respect to the ease of synthesis and availability of raw materials. Furthermore, it has been found that the size of the tertiary alkyl substituent is critical and that those having fourteen to sixteen carbon atoms manifest an unusually good germicidal effect. It has been found that the nature of the tertiary amine used in the preparation of the quaternary ammonium chlorides has little relative effect on the utility of the compound as a bactericide.

Further details of the preparation of the new compounds are set forth with respect to the following specific examples.

*Example 1*

A glass reaction flask provided with a gas inlet tube adapted to disperse the gas throughout the flask, an efficient stirring mechanism, a thermometer and a gas outlet, was charged with 1184 grams of tertiary tetradecylmercaptan and 23.7 grams of powdered potassium hydroxide. The flask and its contents were weighed prior to assembling the apparatus, and then heated to 110° C. Ethylene oxide was then introduced and absorbed rapidly. After one hour and twenty minutes at 150–155° C., the ethylene oxide stream was interrupted. The flask and contents were again weighed and it was found that 222 grams of ethylene oxide had been absorbed. A stream of carbon dioxide was then passed through the reaction mass for one-half hour while maintaining the temperature between 120° C. and 140° C. The precipitate which was formed was removed by filtration. The filtrate was charged to a distillation flask and distilled through a 24″ Vigreux column. The fraction boiling between 141 and 145° C. at 1.5 mm. was separated and identified as the compound having the following structure:

$$t\text{-}C_{14}H_{29}\text{---}S\text{---}C_2H_4\text{---}OH$$

*Example 2*

A glass reaction flask provided with a gas inlet tube, mechanical stirrer, a thermometer, and a reflux condenser was charged with 200 parts by weight of the compound prepared in the previous experiment. Dry hydrogen chloride was introduced gradually and the temperature rose rapidly to 70° C. The flask was then cooled with water to maintain the temperature below 70° C., and the hydrogen chloride introduction regulated so as to maintain a controllable reaction. After twenty minutes the reaction temperature remained steady at 67° C., and the solution became turbid due to the formation of water. After one hour the temperature dropped to about 40° C. The reaction mixture was then separated and the non-aqueous phase transferred to a distillation flask mounted with a 24″ Vigreux column. A fraction boiling at 121 to 124° C. at a pressure of 1 mm. was separated and identified as having the following structure:

$$t\text{-}C_{14}H_{29}\text{---}S\text{---}C_2H_4\text{---}Cl$$

*Example 3*

A round-bottomed reaction flask was provided with an air condenser topped by an apparatus for introducing reactant and sealed through a drying tube. The flask was charged with a compound prepared in accordance with the preceding example, and approximately three mole equivalents of pyridine were added through the top of the air condenser. The flask and its contents were heated at reflux for four hours. The excess pyridine was then evaporated and the residue mixed with approximately two volumes of ether. The ether solution was decanted and the residue dissolved in acetone. With the evaporation of the acetone a solid composition was obtained and identified as the compound having the following structure:

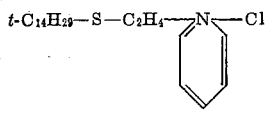

*Example 4*

Using the procedure described in the preceding example except that α-methylpyridine was used in place of the pyridine. The resulting compound was identified as that having the following structure:

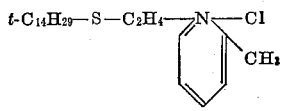

*Example 5*

The procedure of Example 3 was repeated except that *t*-hexadecylmercapto ethyl chloride, derived from hexadecylmercaptan by reaction with ethylene oxide and then reaction with dry HCl, was used. The resulting compound was identified as that having the following structural formula:

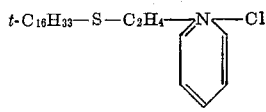

*Example 6*

The procedure of the preceding example was repeated except that methylpyridine was used in place of pyridine. The resulting composition was identified as having the structural formula:

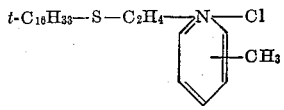

*Example 7*

The products of Examples 3, 4, 5, and 6, were evaluated as bactericides with the bacterium *Eberthella typhi* and the minimum effective concentrations were determined under standard conditions. A similar control evaluation was made of *t*-dodecylmercapto ethyl pyridinium hydrochloride having the structure:

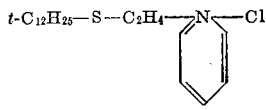

The following table demonstrates that the tertiary tetra-decyl and tertiary hexa-decyl derivatives are more effective than the homologous dodecyl derivatives in the destruction of bacteria.

| Product of— | Effective Concentration One part of— |
|---|---|
| Example 3 | 11,500. |
| Example 4 | 11,000. |
| Example 5 | 22,500. |
| Example 6 | 30,000. |
| Control, Example 7 | >5,000. |

The present application is a continuation-in-part of copending application Serial No. 75,981, filed February 11, 1949 and now abandoned.

The invention is defined by the following claims.

What I claim is:

1. Quaternary ammonium chlorides having the structure:

$$R-S-CH_2CH_2-X$$

wherein X is a radical of the group consisting of:

and

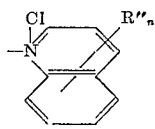

wherein R is a tertiary alkyl radical having from 14 to 16 carbon atoms derived by the polymerization of a substance of the group consisting of propylene, isobutylene and mixtures of propylene and isobutylene, and wherein R' and R'' are selected of the group consisting of hydrogen atoms and alkyl radicals having up to three carbon atoms, and wherein m and n are integers from (0) zero to (3) three, inclusive, indicative of the number of R' and R'' substituents.

2. The compound defined by claim 1 wherein the alkene has 14 carbon atoms and the X radical is

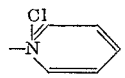

3. The compound defined by claim 1 wherein the alkene has 16 carbon atoms and the X radical is

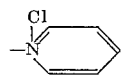

4. The compound defined by claim 1 wherein the alkene has 16 carbon atoms and the X radical is

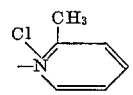

5. The compound defined by claim 1 wherein the alkene has 14 carbon atoms and the X radical is

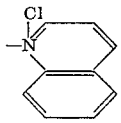

6. The compound defined by claim 1 wherein the alkene has 16 carbon atoms and the X radical is

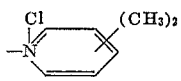

7. Quaternary ammonium chlorides having the structure:

$$R-S-CH_2CH_2-X$$

wherein X is a radical having the structure:

wherein R is a tertiary alkyl radical having from 14 to 16 carbon atoms derived by the polymerization of a substance of the group consisting of propylene, isobutylene and mixtures of propylene and isobutylene, and wherein R' is selected from the group consisting of hydrogen atoms and alkyl radicals having up to 3 carbon atoms, and wherein m is an integer from (0) zero to (3) three, inclusive, indicative of the number of R' substituents.

JOHN K. FINCKE.

References Cited in the file of this patent

UNITED STATES PATENTS

| Number | Name | Date |
|---|---|---|
| 2,125,901 | Evans et al. | Aug. 9, 1938 |
| 2,548,679 | Olin | Apr. 10, 1951 |

FOREIGN PATENTS

| Number | Country | Date |
|---|---|---|
| 684,432 | Germany | Nov. 28, 1939 |